July 10, 1962 L. L. RUFFLE ETAL 3,043,607
HYDRAULIC LEVELIZING CONTROL FOR VEHICLE SUSPENSION
Filed Dec. 6, 1960 3 Sheets-Sheet 1

INVENTORS
Larry L. Ruffle &
BY Raymond J. Schultz

W. F. Wagner
ATTORNEY

INVENTORS
Larry L. Ruffle &
BY Raymond J. Schultz

W. F. Wagner
ATTORNEY

July 10, 1962 L. L. RUFFLE ETAL 3,043,607
HYDRAULIC LEVELIZING CONTROL FOR VEHICLE SUSPENSION
Filed Dec. 6, 1960 3 Sheets-Sheet 3

INVENTORS
Larry L. Ruffle &
BY Raymond J. Schultz
W. F. Wagner
ATTORNEY

United States Patent Office 3,043,607
Patented July 10, 1962

3,043,607
HYDRAULIC LEVELIZING CONTROL FOR
VEHICLE SUSPENSION
Larry L. Ruffle, Saginaw, and Raymond J. Schultz, Bay
City, Mich., assignors to General Motors Corporation,
Detroit, Mich., a corporation of Delaware
Filed Dec. 6, 1960, Ser. No. 74,156
7 Claims. (Cl. 280—124)

This invention relates to vehicle suspension and more particularly to apparatus associated therewith for maintaining the vehicle sprung mass at a constant height irrespective of sprung load.

An object of the invention is to provide an improved vehicle suspension.

Another object is to provide a vehicle suspension incorporating hydraulically operated means for controlling the height of the vehicle sprung mass.

A further object is to provide a coil spring rear wheel suspension for vehicles incorporating hydraulically displaceable upper spring seats which are operative to impose increasing compression loading on the coil springs to offset increase in loading of the sprung mass and thereby maintain the latter at a constant height above the ground.

A still further object is to provide an arrangement of the stated character wherein hydraulic fluid for the displaceable spring seats is derived from engine driven hydraulic pump and particularly from a pump which also supplies hydraulic pressure for vehicle power steering.

Yet a further object is to provide an arrangement of the stated character wherein flow of fluid from the source to the displaceable spring seats is controlled by a three-position flow control device incorporating positive means for preventing backflow from the displaceable seats after adjustment thereof to the desired position.

A still further object is to provide a flow control device having a neutral position in which fluid under pressure from the source is returned to the source reservoir, while reverse flow from the displaceable spring seats is restrained by a unidirectional positive acting check valve; a charging position in which fluid from the source is routed to the spring seats past the check valve and to a pressure relief bypass connected with the source reservoir; and a dumping position in which fluid from the source acts on a check valve displacing element to permit exhausing of fluid from the displaceable spring seats for return to the source reservoir.

Yet a further object is to provide a control device of the stated character in which the enumerated functions are accomplished by axial displacement of a multiple spool valve.

Yet another object is to provide a control device of the stated character in which the spool valve is resiliently biased to the neutral position and manually displaced in opposite direction from neutral to accomplish charging and dumping.

These and other objects, advantages, and features of the invention will become more fully apparent as reference is had to the accompanying specification and drawings wherein.

Figure 1:
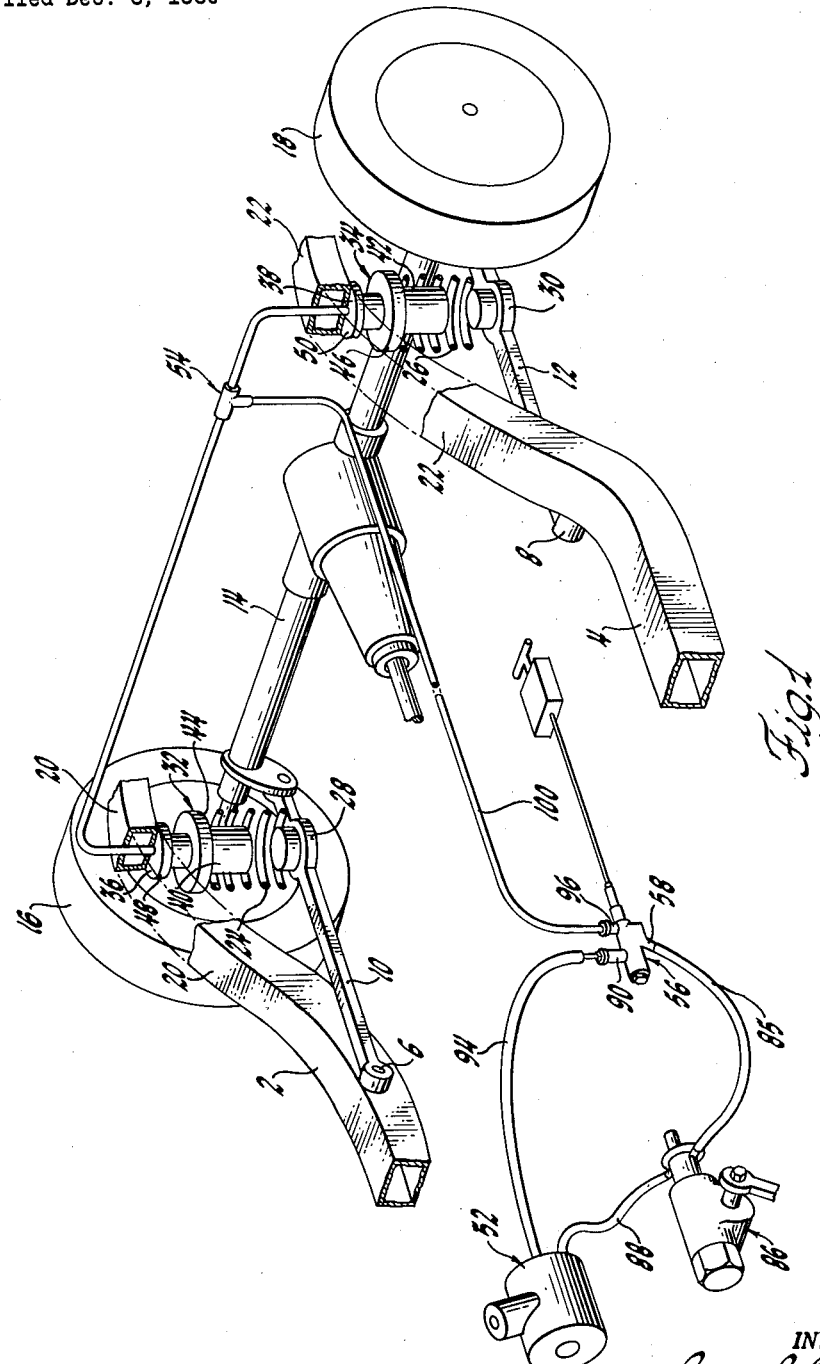
FIG. 1 is a schematic perspective view of a suspension system in accordance with the invention.

Referring now to the drawings and particularly FIG. 1, there is shown a schematic suspension arrangement in which the reference numerals 2 and 4 designate a pair of laterally spaced longitudinally extending frame side rail members. Pivotally attached to rails 2 and 4 at 6 and 8 are a pair of trailing suspension control arms 10 and 12. Arms 10 and 12 are pivotally connected at their rearward ends to a conventional solid rear axle 14 having traction wheels 16 and 18 rotatably mounted at the laterally opposite ends thereof. Interposed between the upwardly bowed kick-up portions 20 and 22 of side rails 2 and 4 and longitudinally intermediate portions of arms 6 and 8 are a pair of coil springs 24 and 26. The opposite ends of springs 24 and 26 engage lower spring seats 28 and 30 on arms 6 and 8, and upper expansible spring seat assemblies 32 and 34. Upper spring seat assemblies 32 and 34 comprise piston elements 36 and 38 secured respectively to kick-up portions 20 and 22 and displaceable cylinder elements 40 and 42 which are disposed in telescoping relation with the adjacent piston elements 36 and 38. Under normal conditions, i.e., when the load imposed on the vehicle sprung mass is equal to or less than the design load, cylinders 40 and 42 are retracted upwardly so that the flanges 44 and 46 thereof are in collapsed abutting contact with the flanges 48 and 50 of pistons 36 and 38. Flanges 44 and 46 then function is fixed spring seats in the conventional manner. However, in accordance with the general features of the invention, pistons 36 and 38 are connected by means of a fluid conduit network 54 to a source of hydraulic fluid pressure in the form of an engine driven power steering pump 52. Conduit network 54 permits the hollow interior (not shown) of cylinders 40 and 42 to be filled with hydraulic fluid and thereby progressively downwardly displace the cylinders so as to decrease the vertical spacing between the upper spring seat flanges 44 and 46 and lower spring seats 28 and 30 and thereby compensate for abnormal loading of the sprung mass.

To accomplish control of flow of hydraulic fluid into and out of cylinders 40 and 42 in accordance with the present invention, a spool valve control device 56 is interposed in network 54 between the pump 52 and pistons 36 and 38. According to the present invention, control device 56 is constructed and arranged so as to provide three defined positions of operation. In the first position, fluid flow from pump 52 is returned to the pump reservoir portion while any fluid already present in network 54 and the interior of cylinders 40 and 42 is positively blocked against movement back to the pump reservoir. In the second position, fluid from pump 52 is introduced into network 54 and cylinders 40 and 42, while concurrent communication is also provided with a bypass pressure relief allowing fluid to be returned to the pump reservoir when system perssure reaches a predetermined maximum. In the third position, fluid pressure from the pump is routed interiorly of the control device in such a way as to overcome the positive blocking action previously referred to and thereby provide a return route for fluid contained in network 54 and cylinders 40 and 42.

Figure 2:
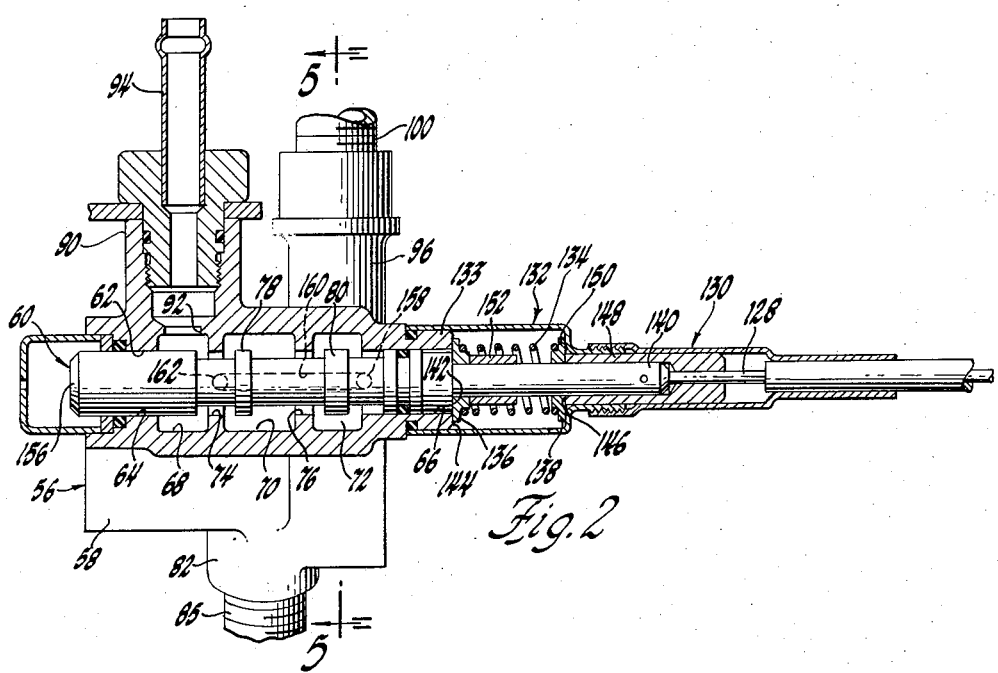
FIG. 2 is an enlarged view, partly in section and with parts broken away, illustrating the details of construction of the control device incorporated in the system of FIG. 1, wherein the spool valve is shown in the neutral or inactive system position.
Figure 6:
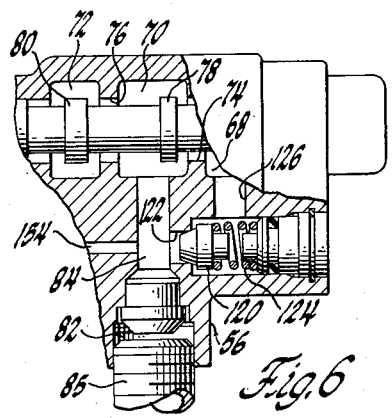
FIG. 6 is a fragmentary sectional view looking in the direction of arrows 6—6 of FIG. 5.

Referring now to FIG. 2, it will be seen that device 56 comprises a cast valve housing 58 having a multiple land spool valve 60 reciprocably disposed in an elongated longitudinally extending passage 62 formed therein. Passage 62 includes sleeve bearing portions 64 and 66 at opposite ends of housing 58 and axially spaced enlarged concentric cavities 68, 70, and 72 which are separated by circular ribs 74 and 76, the inner diameters of which are equal to the outer diameters of lands 78 and 80 formed in axially spaced relation on spool valve 60. Cavity 70 is arranged in direct communicating relation with intake port 82 by a passage 84 (FIG. 6). Port 82 in turn is connected by a conduit 85 to power steering unit 86 and in turn by conduit 88 to pump 52. Cavity 68 of housing 58 communicates with exhaust port 90 via passage 92. Port 90 in turn communicates directly with the reservoir of pump 52 via conduit 94. Cavity 72 of housing 58 communicates with a combined outlet and inlet port 96 via passage 98 (FIG. 5) and port 96 in turn is connected in communicating relation with fluid conduit 100 of network 54 leading to pistons 36 and 38 of expansible spring seat assemblies 32 and 34.

Figure 5:
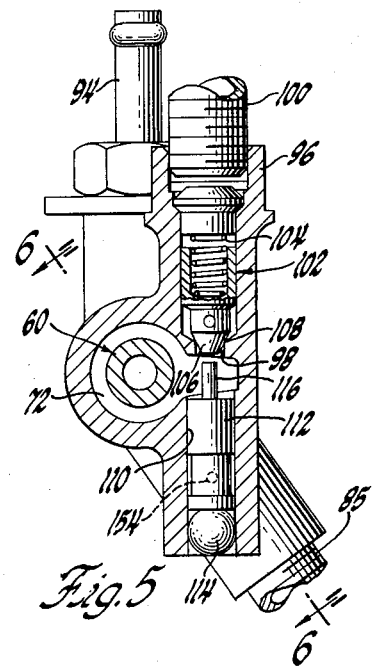
FIG. 5 is an end elevational view, partly in section, looking in the direction of arrows 5—5 of FIG. 2.

As seen best in FIG. 5, passage 98 has disposed therein a poppet type check valve assembly 102 which includes a coil spring 104 acting to urge the tapered end 106 of poppet valve 102 into seating engagement with valve seat 108 of passage 98 and thereby positively prevent flow of fluid from conduit 100 downwardly through passage 98 into cavity 72 of housing 58. However, as will also be seen in FIG. 5, passage 98 extends downwardly in housing 58 below the level of spool valve 60 and cavity 72 to form a lower chamber 110 in which is slidably disposed a piston element 112 which is retained therein by a steel ball 114 pressed into the lower open end of the passage. Piston 112 includes a pin-like extension 116 which is caused to move upwardly under certain conditions of operation, shortly to be described, to displace poppet valve 102 from seat 108 and thereby provide a return flow path for fluid contained in conduit 100 and spring seat assemblies 32 and 34.

As seen best in FIG. 6, housing 58 is also provided with a poppet type relief valve 120 which normally closes a branch passage 122 connecting with intake passage 84. Relief valve 120 is provided with a spring 124 which is calibrated to yield under a predetermined inlet pressure to bypass hydraulic fluid from passage 84 into cavity 68 via passage 126. Obviously, the bypassed fluid will emerge through passage 92 and be returned to the pump reservoir through conduit 94.

Returning now to FIG. 2, it will be seen that spool valve 60 is connected at its right end to an actuating cable 128 which is reciprocable in a sheath 130. Sheath 130 in turn is fastened to a cap sleeve 132 secured to pilot portion 133 surrounding the bearing 66 of housing 58. Cap sleeve 132 surrounds a coil spring 134 biased between longitudinally spaced washers 136 and 138 which surround the rod-like right end 140 of spool valve 60. Washer 136 normally abuts both the shoulder 142 at the left end of rod 140 and the end face 144 of pilot 133, while washer 138 normally abuts both the face 146 of collar 148 and the shoulder 150 formed at the right end of cap sleeve 132, spring 134 thus serving to resiliently bias spool valve 60 to the axial position shown in FIG. 2. By reference to FIGS. 3 and 4, it will be seen that the spring and collar arrangement described permits spool valve 60 to be axially displaced either to the right or left of the neutral position shown in FIG. 2 by manual pressure on cable 128, yet be returned to the neutral position automatically upon release of manual pressure in either direction. A sleeve spacer 152 slidably disposed on rod 140 between washers 136 and 138 functions to provide positive positioning of spool valve 60 in both of the displaced positions.

In order that the invention may be more fully understood, a description of operation of the control device in each position follows:

Position I

With the spool centered as shown in FIG. 2, hydraulic fluid from pump 52 enters housing 58 through port 82 and flows into annular cavities 68, 70 and 72. From cavity 68, hydraulic fluid is directed into port 90 and passes out of the housing through conduit 94 for return to the reservoir of pump 52. Hydraulic fluid in passage 84 of port 82 also flows through passage 154 (FIG. 6) and fills the portion of bore 98 below piston 112, thereby maintaining the latter in hydraulic balance. Hydraulic fluid in cavity 72 is prevented from emerging through port 96 by poppet valve 102, owing to the fact that the return path provided by conduit 94 prevents building up of hydraulic pressure within housing 58 sufficient to overcome the spring pressure on poppet 102. Hence, even though the pump is continuously delivering hydraulic fluid under pressure into housing 58, no fluid is supplied to the cylinder assemblies 32 and 34 associated with the rear suspension. At the same time, the level of hydraulic fluid already present in the cylinder assemblies is prevented from returning to the pump reservoir due to the positive blocking action of poppet valve 102 engaging seat 108 of passage 98.

Position II

Figure 3:
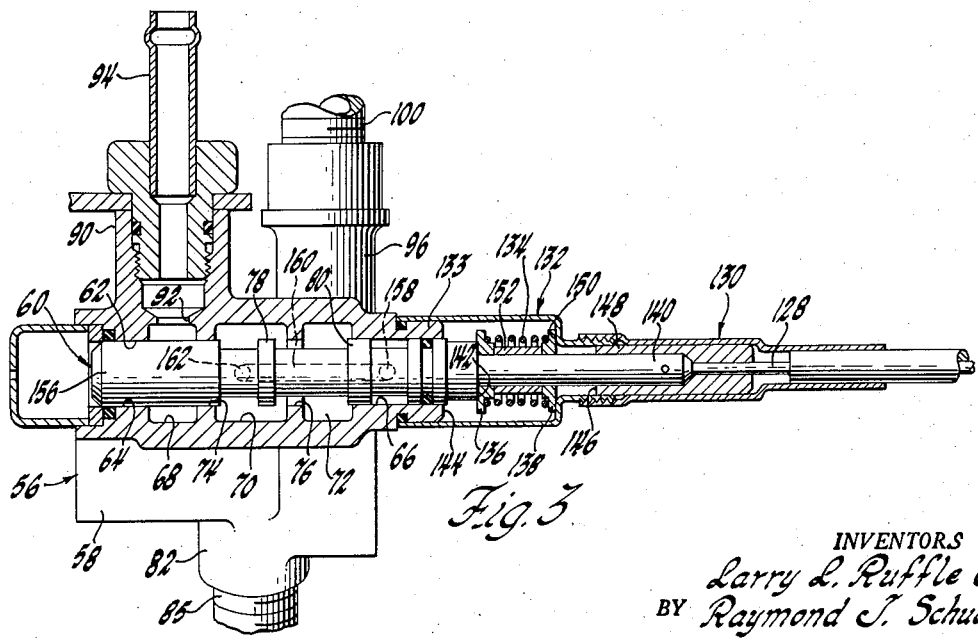
FIG. 3 is a view similar to FIG. 2 with the spool valve moved to a position causing flow of hydraulic fluid from the source to the displaceable spring seats.

When cable 128 is pulled to displace spool valve 60 to the position shown in FIG. 3, hydraulic fluid in passage 84 of port 82 passes into annular cavities 70 and 72, but is blocked from cavity 68 by the movement of the end 156 of spool 60 into the aperture formed by rib 74. As stated previously, hydraulic fluid in passage 84 flows through passage 154 and emerges in the portion of passage 98 below piston 112 so that equal hydraulic pressure is exerted on both ends of the piston and therefore maintains it in a balanced state. Consequently, hydraulic fluid pressure in cavity 72 builds up until sufficient to displace poppet valve 102 against the action of spring 104. As soon as the tapered nose 106 of poppet 102 is lifted from seat 108, hydraulic fluid passes through the transverse passage 158 and internal passage 160 and flows through port 96 and conduit 100 into cylinder assemblies 32 and 34. When the cylinder portions 40 and 42 have been displaced downwardly the desired amount, cable 128 is released and spool valve 60 resumes the position shown in FIG. 2 under the influence of spring 134. Naturally, poppet valve 102 resumes the closed position under the influence of spring 104 and hence positively prevents loss of fluid from the cylinder assemblies.

Position III

Figure 4:
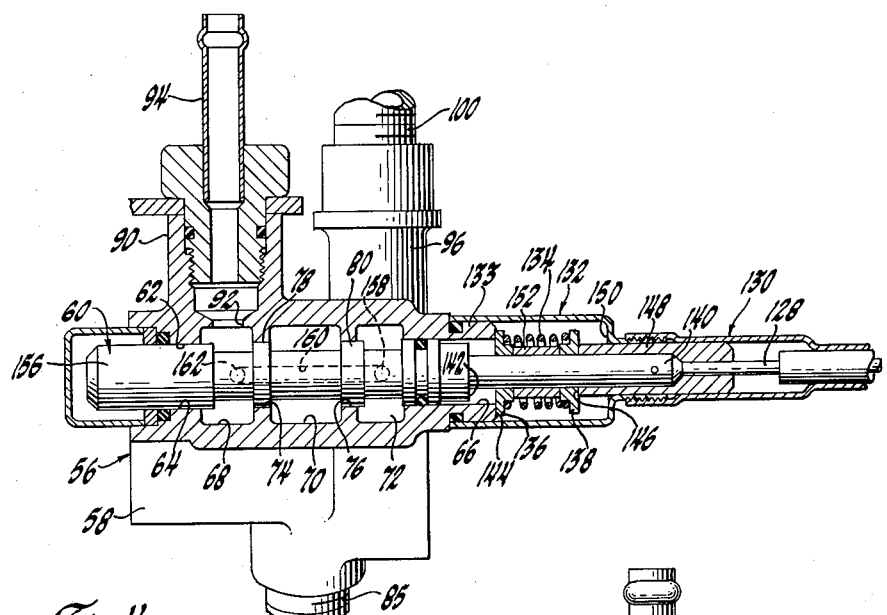
FIG. 4 is a view similar to FIGS. 2 and 3 with the spool valve moved to a position accomplishing return flow of fluid from the displaceable seats to the source reservoir.

When it is desired to reduce the downward displacement of cylinders 40 and 42, cable 128 is pushed toward the left until the spool valve 60 reaches the position shown in FIG. 4, which position is positively located by the abutting action of washers 136 and 138 and the spacer 152 disposed therebetween. With spool valve 60 in the position shown in FIG. 4, both cavities 68 and 72 are blocked from communication with port 84 by lands 78 and 80 which function to close apertures formed by ribs 74 and 76. Hence, hydraulic fluid flows from passage 84 only into cavity 70 which is now a dead end, owing to the placement of lands 78 and 80. Therefore, the sole remaining flow path for pump generated fluid pressure is through passage 154 into the portion of passage 98 below piston 112. As pressure builds up in the lower portion of passage 98, piston 112 is urged upwardly until the stem 116 unseats poppet 102. With poppet 102 in the open position, fluid from the cylinder assemblies flows back through conduit 100 and port 96 to enter cavity 72. From cavity 72, the hydraulic fluid passes into transverse passage 158, internal passage 160, and transverse passage 162, all of which are formed in spool valve 60. Since passages 158, 160 and 162 allow fluid flow from cavity 72 to cavity 68, return flow of fluid from the cylinder assemblies emerges through port 90 and returns to the reservoir of pump 52. It will be evident that during this phase of operation, after upward displacement of piston 112, hydraulic pressure will build up in cavity 70. However, as soon as this pressure reaches a predetermined level, relief poppet 120 (FIG. 6) is displaced from passage 122 and allows return of pump generated hydraulic fluid to the pump reservoir in the same manner as described in connection with Position I. As soon as the vehicle reaches the desired vertical level, pressure on cable 128 is released whereupon spring 134 acts to recenter the spool valve 60 to the position shown in FIG. 2. Poppet valve 102 and relief valve 120 are promptly restored to seated position by the action of their respective springs, and the condition described in connection with Position I is restored.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. In a vehicle suspension having hydraulically displaceable spring seats for maintaining the vehicle in a level attitude, a control device for regulating the displaced position of said spring seats comprising, a housing having a spool valve slidably disposed therein, said housing having three spaced annular cavities formed therein concentrically of said spool valve, said spool valve having lands formed thereon in spaced relation such that in one position of said spool all of said cavities of said housing are in common communication, in a second position two of said cavities are in common communication, and in a third position each of said cavities are separated by said lands, said spool having a passage formed internally thereof providing communication between said first and third cavities only when said spool is in said third position.

2. In a vehicle coil spring suspension having hydraulically displaceable spring seats for maintaining the vehicle in a level attitude, a source of hydraulic pressure, conduit means connecting said source with said displaceable seats, a control device interposed in said conduit means for regulating the displaced position of said spring seats comprising, a housing having a spool valve slidably disposed therein, said housing having three spaced annular cavities formed therein concentrically of said spool valve, said spool valve having circumferential lands formed therein in axially spaced relation such that in one position of said spool all of said cavities of said housing are in common communication with said source, in a second position two of said cavities are in common communication with said source, and in a third position each of said cavities are separated by said lands so that only one of said cavities communicates with said source, said spool having a passage formed internally thereof providing communication between the other two cavities when said spool is in said third position.

3. The structure set forth in claim 2 wherein said one of said cavities is between the other two cavities.

4. The structure set forth in claim 1 wherein said first cavity is connected to an exhaust passage, said second cavity is connected to a combined discharge and return passage, said discharge and return passage having a check valve therein, and a piston slidably disposed in said last mentioned passage preventing communication between said second and third cavities via said passage.

5. The structure set forth in claim 1 wherein said first cavity is connected to an exhaust passage, said second cavity is connected to a combined discharge and return passage, said discharge and return passage having a check valve therein which normally seats in the direction of return flow, and a piston slidably disposed in said last mentioned passage preventing communication between said second and third cavities via said passage.

6. The structure set forth in claim 2 wherein said first cavity is connected to an exhaust passage leading to the reservoir of said source of fluid pressure, said second cavity is connected to a combined discharge and return passage leading to said displaceable spring seats, said discharge and return passage having a check valve therein spring biased in the direction of return flow, and a piston slidably disposed in said last mentioned passage preventing communication between said second and third cavities via said passage.

7. The structure set forth in claim 2 wherein said first cavity is connected to an exhaust passage leading to the reservoir of said pressure source, said second cavity is connected at one end to an inlet passage communicating with said pressure source and at the other end to a combined discharge and return passage communicating with said displaceable spring seats, said discharge and return passage having a check valve therein biased in the return flow direction, and a piston slidably disposed in said last mentioned passage below said check valve preventing communication between said second and third cavities via said passage.

References Cited in the file of this patent

UNITED STATES PATENTS

| | | |
|---|---|---|
| 2,809,051 | Jackson | Oct. 8, 1957 |
| 2,868,174 | Shutt | Jan. 13, 1959 |